United States Patent Office 3,775,369
Patented Nov. 27, 1973

3,775,369
METHOD OF POLYMERIZING UNSATURATED MONOMERS WITH ORGANOCALCIUM COMPOUNDS
Carl A. Uraneck, William J. Trepka, and James D. Brown, Bartlesville, Okla., assignors to Phillips Petroleum Company
No Drawing. Filed July 29, 1971, Ser. No. 167,456
Int. Cl. C08g 15/00
U.S. Cl. 260—63 R                    39 Claims

ABSTRACT OF THE DISCLOSURE

Polymerization initiators are produced from substantially pure calcium metal together with polynuclear aromatic compounds or polyaryl substituted ethylenes.

---

This is a division of application Ser. No. 784,177, filed Dec. 16, 1968, now allowed and issued as U.S. Letters Patent 3,642,922, Feb. 15, 1972.

This invention relates to the process for manufacturing polymerization initiators and to the composition of matter thereby produced.

In another embodiment this invention relates to a polymerization process utilizing a unique initiator.

It is well recognized that there are known organoalkali metallic compounds such as the alkyllithium and sodium compounds suitable as initiators for the polymerization of hydrocarbon monomers such as conjugated dienes or vinyl-substituted aromatic compounds. These known initiators are effective for the polymerization of hydrocarbon monomers to form homopolymers and copolymers of random and block configurations, but they are often not suitable for the polymerization of various other types of monomers such as $\alpha,\beta$-unsaturated nitriles, esters of acrylic and methacrylic acid, vinylpyridines, vinylquinolines, vinylpyrrolidones, vinyl ketones, vinyl esters, and the like. These organoalkali metal compounds often react with these latter named monomers at temperatures ordinarily suited for polymerization instead of effecting polymer formation.

When producing an organocalcium compound, it has been thought necessary to first activate the calcium by contacting it with mercury to form an alloy or amalgam before contacting it with an organic component, or by forming a combination with organocalcium halides and other materials in order to produce organocalcium compounds that are complexed.

It has now been discovered that polymerization initiators can be produced from polynuclear aromatic hydrocarbons and from polyaryl-substituted ethylenes when contacted with elemental calcium without first forming the alloy or amalgam with mercury.

It has also been discovered that the unique calcium initiators that are formed according to this invention are effective polymerization initiators capable of polymerizing a large variety of monomers comprising unsaturated organic compounds which generally contain the characteristic structure $CH_2=C<$.

These initiators can, like the organoalkali metal initiators, initiate the polymerization of conjugated dienes and vinyl substituted aromatic hydrocarbons.

Our novel initiators are effective, not only to polymerize monomers of the styrene and butadiene type, but are capable also of initiating the polymerization of monomers such as polymerizable $\alpha,\beta$-unsaturated nitriles, esters of acrylic and methacrylic acid, vinyl ketones, vinylpyridines, vinylquinolines, vinylpyrrolidones, and vinyl esters and the like at temperature ordinarily suited for polymerization.

It is an object of this invention to produce a novel polymerization initiator capable of initiating polymerization of broad varieties of polymerizable monomers such as conjugated dienes, vinyl substituted aromatic hydrocarbons, $\alpha,\beta$-unsaturated nitriles, vinyl ketones, vinylpyridines, vinylquinolines, vinylpyrrolidones, esters of acrylic and methacrylic acid, or vinyl esters, and the like.

It is another object of this invention to provide an improved method for producing calcium polymerization initiators by eliminating the amalgam mercury activation process and thus eliminate the handling of this toxic material as well as jointly conserving time and expense.

It is still another object of this invention to provide a novel polymerization process incorporating the polymerization initiators of this invention. Other objects, advantages, and features of our invention will be apparent to those skilled in the art from the disclosure and discussion herein set forth.

The polynuclear aromatic/calcium compounds produced according to this invention are prepared from aromatic hydrocarbons containing at least a 3-ring structure in which at least two of said rings are aromatic and at least two of said rings are fused and said polynuclear aromatic hydrocarbon comprises from 12 to 40 carbon atoms per molecule. These polynuclear aromatic hydrocarbons can contain alkyl, cycloalkyl, aryl, alkoxy, aryloxy, alkylthio, arylthio, or N,N-dialkylamino substituents and combinations thereof such as cycloalkylalkyl, arylalkyl, and the like, wherein the carbon atoms of the substituents total not more than 25. Exemplary of those polynuclear aromatic compounds which can be utilized according to this invention comprise anthracene; 9,10-dimethylanthracene; 9,10-diphenylanthracene; phenanthrene; 9,10-benzophenanthrene; 2,3-benzanthracene; 1,2-benzanthracene; chrysene; acenaphthylene; perylene; fluoranthene;

3-(3-ethylcyclohexyl)anthracene;
4-(2-cyclohexylethyl)tetracene;
4,7-diethoxyfluoranthene;
1-phenoxy-6-methylcoronene;
6-(ethylthio)aceanthrylene;
6,8-di(phenylthio)hexacene;
7-(N,N-diethylamino)acephenanthrylene;
3,8,14-(triphenoxy)trinaphthylene;
1,3,6,8-(tetraphenylthio)pyrene;
1,15-(dipentyl)pyranthrene;
4-(N,N-dimethylamino)perylene;

heptaphene; heptacene; pentaphene; rubicene; pleiadene; pentacene; 1,4,8,11-(tetracyclohexyl)pentacene; 9-methylanthracene; 9-phenylanthracene; 9,10-dicyclohexylanthracene; or 9,10-di(N,N-dimethylamino)anthracene; and the like.

The polyaryl-substituted ethylene calcium compounds produced according to this invention are prepared from ethylene that has been substituted with at least two aryl radicals and said polyaryl-substituted ethylene compound contains from 14 to 40 carbon atoms per molecule. These said aryl substituents can contain alkyl, cycloalkyl, aryl, alkoxy, aryloxy, alkylthio, arylthio, or N,N-dialkylamino radicals and combinations thereof such as cycloalkylalkyl, arylalkyl, and the like, wherein the total carbon atoms of these latter radicals total not more than 25. Exemplary of those compounds which can be utilized according to this invention comprise cis and trans 1,2-diphenylethylene (stilbene); 1,1-diphenylethylene; triphenylethylene; tetraphenylethylene;

1-phenyl-2-(1-naphthyl)ethylene;
1,1-diphenyl-2-(2-naphthyl)ethylene;
1,2-di(1-naphthyl)-ethylene;
1-(4-methoxyphenyl)-1-(4-phenoxyphenyl)-2-[4-(3-methylcyclopentyl)-phenyl]-2-(4-cyclohexylmethyl-phenyl)ethylene;
1-(4-methylthiophenyl)-1-(4-phenylthiophenyl)-2-[4-(N,N-diethylamino)phenyl]ethylene;
tetra-(4-phenoxy-phenyl)ethylene;
tetra-(1-naphthyl)ethylene, and the like.

When preparing the initiators of this invention, substantially pure elemental calcium is employed in the form of turnings or shot, or the like, so as to provide a form of calcium with as much exposed surface area as possible. It is important that the calcium be protected from air and maintained accordingly so as to prevent the formation of oxides thereon.

The polymerization initiators of this invention comprise the reaction products which form when the polynuclear aromatic compound or the polyaryl-substituted ethylene and the elemental calcium are brought together at a temperature in the range of about −100 to 200° F., preferably about −20 to 125° F. The contacting is carried out in the presence of an ethereal diluent of mono- or polyethers including acyclic and cyclic ethers. Alkyl, aryl or cycloalkyl ethers, or combinations thereof, containing 2 to 20 carbon atoms per molecule and about 1 to 4 ether groups per molecule can be employed. Exemplary ethers are diethyl ether, dibutyl ether, methyl butyl ether, phenyl methyl ether, diphenyl ether, cyclohexylmethyl ether, tetrahydrofuran, 1,2-dimethoxyethane, 1,4-dioxane, and the like. Tetrahydrofuran; 1,2-dimethoxyethane; and 1,4-dioxane are the preferred diluent ethers.

The ethereal diluents are believed likely to form ether complexes with the organocalcium initiator thus formed.

When a very finely divided calcium form is employed such as produced by the vaporization of calcium in an electric furnace as described by V. Sinn, B. Francois, N. Mayer and J. Parrod in Compt. Rend. (Paris), 262, Ser. C, pp. 541–544 ((1966), it is unnecessary to contact the organic compound with the calcium in the presence of an ether diluent. The contacting can then be carried out generally in any inert diluent such as aliphatic, aromatic, cycloaliphatic, or araliphatic hydrocarbons and the like, and the ether need not then be employed.

Employment of the vaporized metal is not the preferred procedure due to the more costly and more complex electric furnace procedure used for the preparation of such a very divided metal.

Metals that have been prepared by such a method often possess polymerization initiator activity themselves, but are, however, generally inferior to the initiators of this invention. The solutions or suspensions of the initiators produced according to this invention are more easily handled in charging, measuring, or other transfer operations than the vaporized metal themselves. This subsequently results in improved control of the polymerization reaction in terms for initiator level and thus the molecular weight of the polymer.

Another disadvantage of conducting polymerization reactions with finely divided metals, as produced by the electric furnace method, is that they often show long induction periods and then rapid uncontrolled reactions.

Also, these very finely divided metals are more susceptible to inactivation by accidental contact with air or other oxygen-containing gases resulting in inactivation of large portions of the finely divided metal by the formation of an oxide surface coating thereon.

The ratio of gram atoms of calcium to moles of polynuclear aromatic compound or to moles of polyaryl-substituted ethylene is in the range of about 1:1 to 25:1. It is preferred to use an amount of calcium in excess of the 1:1 ratio with the more preferred ratio being from 4:1 to 15:1.

A quantitative determination of the extent of product formation can be made by employing a hydrolyzed portion of the organocalcium reaction mixture and analyzing by titration, with an acid such as hydrochloric acid and employing phenolphthalein as an indicator or by any other suitable analytical method known to the art, so as to measure the alkaline molarity of the reaction mixture. When the alkaline molarity of the calcium adduct reaction mixture is essentially equal to the molar concentration of the starting polynuclear aromatic or polyaryl-substituted ethylene compound essentially complete conversion to the calcium adduct has been obtained assuming that only one gram atom of calcium forms an adduct with one mole of polynuclear compound.

Qualitative evidence of the initiator formation occurring is readily apparent from the usualy vivid color transformation that occurs when the initiator begins to form. The color and degree and rate of color change will depend, in part, upon the particular organic compound employed.

Organic promoters which react immediately to expose fresh calcium surface metal can also be employed during the preparation of the initiator. Alkyl or alkylene halogen-containing promoters such as 1,2-dibromoethane, methyl iodide, ethyl bromide, or ethyl iodide and the like function accordingly. The well-known Grignard reaction utilizes such promoters and is described in Organo-Metallic Compounds by G. E. Coates, pp. 46–47, 2nd ed., John Wiley & Sons, Inc., New York (1960).

The amount of promoter, if employed, is generally in the range of about 0.002 to 0.2 mole, preferably about 0.005 to 0.1 mole per gram atom of calcium, and preferably containing the bromide or iodide halogen and with 1,2-dibromoethane being the preferred promoter for use with this invention.

The initiators, if washed in a non-reactive liquid in which they are less soluble (in comparison to the ethereal diluent in which they were originally formed) show improved initiator activity.

The washing removes excess unreacted organic components and removes excess diluent ether.

Aliphatic or aromatic hydrocarbons such as xylene, toluene, n-pentane, or iso-octane are suitable washing liquids. Toluene is the washing liquid preferred. The initiators suitable for washing, as herein described, are those recoverable from the ether diluent. The calcium anthracene compound is particularly suited for washing for it is sufficiently insoluble in the ether diluent in that it precipitated as it was formed.

As hereinbefore mentioned, the calcium initiator of this invention can be used to polymerize a broad variety of monomers to form homopolymers or random and block copolymers.

Conjugated dienes, vinyl-substituted aromatic hydrocarbons, α,β-unsaturated nitriles, esters of acrylic and methacrylic acid, vinyl ketones, vinylpyridines, vinylquinolines, vinylpyrrolidones, vinyl esters and the like are effectively polymerized in the presence or absence of diluents. Any diluent which is relatively inert, non-deleterious, and liquid under the reaction conditions of the process can be utilized. Hydrocarbon diluents such as paraffins, cycloparaffins, aromatics and the like, can be used as well as others well known to the art. Conditions ordinarily suited and well known in the art for polymerization can be employed with temperatures generally in the range of about −100 to 200° F., with the range from −20 to 125° F. being preferred. Higher and lower temperatures can be employed if desired. The initiator is generally employed in a concentration of about 0.1 to 100 gram millimoles per 100 grams of monomer(s) employed mhm.) and preferably about 1 to 20 (mhm.).

Exemplary of these polymerizable compounds are acrylonitrile; methacrylonitrile; cinnamonitrile; 2-butenenitrile; 2-octenenitrile; 2-dodecenenitrile; 2-methyl-2-decenenitrile; methyl acrylate; ethyl acrylate; butyl acrylate; cyclohexyl acrylate; octyl acrylate; dodecyl acrylate; methyl methacrylate; ethyl methacrylate; butyl methacrylate; cyclohexyl methacrylate; octyl methacrylate; dodecyl methacrylate; benzyl acrylate; benzyl methacrylate; vinyl acetate; vinyl butyrate; vinyl 2-ethylhexanoate; vinyl octanoate; vinyl cyclohexanoate; vinyl benzoate; vinyl phenylacetate; vinyl dodecanoate; methyl vinyl ketone; benzyl vinyl ketone; ethyl vinyl ketone; butyl vinyl ketone; octyl vinyl ketone; phenyl vinyl ketone; 1-naphthyl vinyl ketone; 2-ethylhexyl vinyl ketone; cyclohexyl vinyl ketone; cyclododecyl vinyl ketone; 3-methylcyclopentyl vinyl ketone; 4-ethylphenyl vinyl ketone; decyl vinyl ketone; 5-cyclopentyl-2-naphthyl vinyl ketone; styrene; 4-ethylstyrene; 1-vinylnaphthalene; 2-vinylnaphthalene; 9-vinylanthracene; 3-vinylphenanthrene; 4-dodecylstyrene; alpha-methylstyrene; 2-alpha-methylvinylnaphthalene; 1,3-butadiene; isoprene; 2,3-dimethyl-1,3-butadiene; 1,3-pentadiene; 1,3-hexadiene; 4,5-diethyl-1,3-octadiene; 2-phenyl-1,3-butadiene; 3-methyl-1,3-heptadiene; 2-vinylpyridine; 4-vinylpyridine; 2-methyl-5-vinylpyridine; 4-vinylquinoline; 2-methyl-8-vinylquinoline; 1-vinyl-2-pyrrolidone; or 1-vinyl-3,3-dimethyl-2-pyrrolidone; and the like.

The reaction medium employed for preparing the calcium initiators is also suitable for the polymerization process. An in situ technique can be employed for preparing the initiators and for conducting the polymerization process. In this method of operation, all materials for initiator preparation and polymerization are charged initially. As the calcium reaction product is formed it initiates polymerization of the monomer present in the system.

Since many types of monomers can be polymerized in the presence of this initiator, a wide variety of products can be obtained. Products ranging from low to high molecular weight are produced depending upon the monomers used as well as the type and amount of initiator. Products can be obtained which range from liquids to elastomers and hard plastics.

The solid polymers prepared according to our invention can be employed to produce by conventional methods various molded plastic articles such as containers and the like. The polymers can also be blended with each other, or with various types of known polymeric products to produce useful articles. The low molecular weight polymers of conjugated dienes can be vulcanized to produce hard, resinous potting compounds for the electrical industry. They can also be employed for various other uses such as plastiiczers, tackifiers and the like. The elastomeric polymers can be compounded with vulcanizing agents, fillers, antioxidants, plasticizers, extender oils and the like to produce rubbery products suitable for use as tire treads, hose, belting, gaskets and the like.

EXAMPLE I

The organo calcium initiators were prepared by reacting calcium with the following exemplary polynuclear aromatic hydrocarbons and polyarylsubstituted ethylenes:

Anthracene 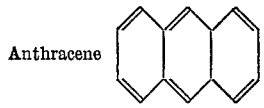

Acenaphthylene 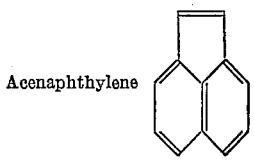

Perylene 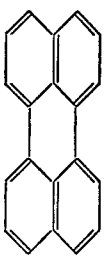

Fluoranthene 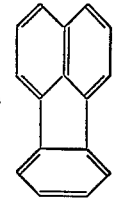

1,2-benzanthracene 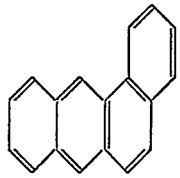

2,3-benzanthracene 

9,10-diphenylanthracene 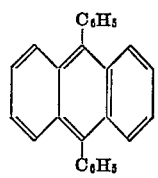

9,10-dimethylanthracene 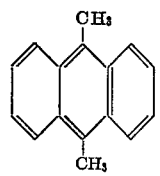

Phenanthrene 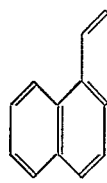

Chrysene 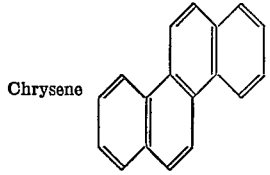

Stilbene 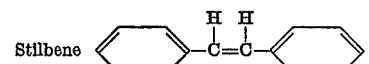

Tetraphenylethylene 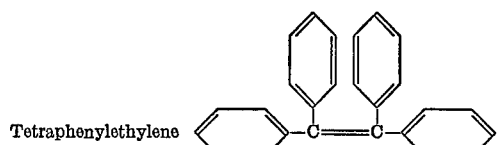

The calcium was employed in the form of turnings or shot. The recipe was as follows:

Polynuclear aromatic compound, mole: variable
Calcium, gram atoms: 0.10 [a]
1,2-dibromoethane, mole: 0.001 (0.10 ml.)
Tetrahydrofuran, ml.: 100
Temperature, °F.: variable
Time, hours: variable

[a] Except for run 10 where 0.016 gram atoms was used.

Table I summarizes the data for the experiments including the quantities of the various materials employed for the preparation of the organo-calcium initiator adducts, the ratio of gram atoms of calcium to moles of polynuclear aromatic compound, temperature, time of each reaction, alkalinity, and conversion of polynuclear hydrocarbon.

In Runs 1, 2, and 6, the polynuclear aromatic compound was charged first followed by the calcium and then the tetrahydrofuran. The reactor was flushed with argon and 1,2-dibromoethane was added. In Runs 3 and 7 through 16, the polynuclear aromatic compound, calcium, tetrahydrofuran, and 1,2-dibromoethane were charged in the order listed. The reactor was not flushed with argon. In Runs 4 and 5, tetrahydrofuran was charged first after the reactor was purged with nitrogen. Calcium was added and then the polynuclear aromatic compound. The reactor was flushed with argon and after 4.5 hours the 1,2-dibromoethane was introduced.

The alkalinity of each reaction product was determined by titration of a hydrolyzed portion of the reaction mixture with 0.1 N HCl and the extent of conversion of the polynuclear aromatic compound as beforementioned to the organocalcium initiator was calculated from the titration value.

In Runs 1 through 4, and 25 and 27, for the homopolymerization of butadiene, a 10 weight percent solution of 2,2-methylene-bis(4-methyl-6-tert-butylphenol) in isopropyl alcohol was added at the completion of the polymerization time, the amount used being sufficient to provide approximately 1 part by weight of antioxidant per 100 parts by weight of the polybutadiene. In all of the other polymerization runs, isopropyl alcohol was added alone. Polymers were recovered by coagulation in isopropyl alcohol. They were dried under a vacuum at 140° F.

Runs 14 through 16 represent the production of copolymers from methyl methacrylate and a second monomer. Toluene was charged first after which the reactor was purged with nitrogen. The monomer other than methyl methacrylate was added, i.e., butadiene, styrene, or ethyl vinyl ether, then the methyl methacrylate, the temperature was adjusted to the level employed for polymerization, and the initiator was introduced last.

In Runs 17 through 20, which represent the production of block copolymers, cyclohexane was charged first, the reactor was purged with nitrogen, methyl methacrylate was added and the temperature was adjusted to 41° F. The initiator was then introduced. After 18 hours the second monomer was added. The temperature was maintained at 41° F. for 66 hours, and then increased to 122° F. and maintained at this level for 18 hours. Runs 23 and 24 also represent the production of block copolymer. Toluene was charged first, the reactor was purged with nitrogen, methyl methacrylate was added, the temperature was adjusted to −22° F., and the initiator was introduced. Run 9 also represents the production of a block copolymer of styrene/butadiene and the polystyrene segment was analyzed at 8 weight percent of the total

TABLE I

| Run No. | Polynuclear hydrocarbon Type | Moles | Ca:polynuclear Hc, mole ratio | Temp., °F. | Time, hrs. | Alkalinity, N | Conversion of hydrocarbon, wt. percent |
|---|---|---|---|---|---|---|---|
| 1 | Anthracene | 0.025 | 4:1 | 122 | 98 | 0.210 | 42 |
| 2 | Acenaphthylene | 0.010 | 10:1 | 122 | 144 | 0.102 | 51 |
| 3 | do | 0.025 | 4:1 | 122 | 74 | 0.28 | 55 |
| 4 | do | 0.025 | 4:1 | −22 | 74 | 0.25 | 50 |
| 5 | do | 0.025 | 4:1 | 41 | 75 | 0.286 | 57 |
| 6 | Perylene | 0.010 | 10:1 | 122 | 195 | 0.119 | 59 |
| 7 | Fluoranthene | 0.010 | 10:1 | 122 | 74 | 0.080 | 40 |
| 8 | 1,2-benzanthracene | 0.010 | 10:1 | 122 | 195 | 0.053 | 26 |
| 9 | 2,3-benzanthracene | 0.004 | 4:1 | 122 | 144 | 0.020 | 25 |
| 10 | 9,10-diphenylanthracene | 0.010 | 10:1 | 122 | 195 | 0.038 | 19 |
| 11 | 9,10-dimethylanthracene | 0.010 | 10:1 | 122 | 100 | 0.045 | 50 |
| 12 | Phenanthrene | 0.025 | 4:1 | 122 | 144 | 0.027 | 6 |
| 13 | Chrysene | 0.025 | 4:1 | 122 | 144 | 0.027 | 6 |
| 14 | Stilbene | 0.025 | 4:1 | 122 | 73 | 0.027 | 6 |
| 15 | Tetraphenylethylene | 0.007 | 14:1 | 122 | 144 | 0.014 | 10 |

Example I exemplifies fruition of this invention by successfully demonstrating the preparation and production of the organocalcium initiators of this invention.

EXAMPLE II

The organocalcium initiators of Example I were employed as initiators for homopolymerization, and for random and block copolymerization, employing a series of exemplary monomers. Table II summarizes the quantities of the various monomers employed, the quantities of the particular initiator from Example I, the temperature and time of each reaction, the weight percent of monomer, the conversion, the inherent viscosities and a general description of the type of polymer produced.

Homopolymerizations were conducted in the presence of either toluene or cyclohexane diluents which were charged to the reactor first. The reactor was then purged with nitrogen after which the monomer was introduced, the temperature was adjusted to the level employed for the polymerization, and the initiator was added.

polymer. In Run 23, 2-methyl-5-vinylpyridine was added after 0.75 hour and the reaction was continued at −22° F. for 14.9 hours. In Run 24, N-vinyl-2-pyrrolidone was added after 0.5 hour and the reaction was continued at −22° F. for 15.5 hours.

Microstructures for the polybutadiene in Runs 1 and 25 were as follows:

|  | Run 1 | Run 25 |
|---|---|---|
| Cis, percent | 7 | 14 |
| Trans, percent | 75 | 66 |
| Vinyl, percent | 18 | 20 | thus showing that the polymer was predominantly the 1,4-addition product and that the major portion of the unsaturation thereof contains the transconfiguration.

TABLE II

| Run No. | Monomers Type | Parts by wt. | Diluent Type | Parts by wt. | Initiator From Run | Mmoles | Temp., °F. | Time, hrs. | Conversion, percent | Inherent viscosity | Type of product |
|---|---|---|---|---|---|---|---|---|---|---|---|
| 1 | 1,3-butadiene | 100 | Cyclohexane | 780 | 1 | 5.0 | 122 | 24 | 100 | 0.6 | Soft rubber. |
| 2 | do | 100 | do | 780 | 1 | 2.7 | 122 | 16 | 100 | 1.78 | Rubbery solid. |
| 3 | do | 100 | do | 780 | 1 | 3.4 | 122 | 23 | 88 | 1.44 | Do. |
| 4 | do | 100 | do | 780 | 1 | 2.26 | 122 | 20 | 88 | 1.75 | Do. |
| 5 | Styrene | 100 | do | 780 | 1 | 5.0 | 122 | 24 | 32 | 0.04 | Solid polymer. |
| 6 | Methyl methacrylate | 100 | Toluene | 870 | 1 | 4.8 | 41 | 27 | 100 | ¹ 3.76 | Tough, flexible solid. |
| 7 | Isoprene | 100 | Cyclohexane | 780 | 1 | 5.9 | 158 | 22 | 98 | .46 | Soft rubber. |
| 8 | Acrylonitrile | 100 | Toluene | 870 | 1 | 10 | −40 | .5 | 92 | ² .24 | Powder. |
| 9 | {1,3-butadiene / Styrene} | 75 / 25 | Cyclohexane | 780 | 1 | 2.7 | 122 | 27 | 97 | 1.63 | Solid rubbery polymer. |
| 10 | Methyl vinyl ketone | 100 | do | 780 | 2 | 5.0 | 41 | 47 | 80 | ¹ 0.05 | Sticky solid. |
| 11 | Methyl methacrylate | 100 | Toluene | 870 | 3 | 5.0 | 41 | 27 | 100 | ¹ 3.03 | Hard, brittle plastic. |
| 12 | 2-methyl-5-vinylpyridine | 100 | do | 870 | 3 | 5.0 | 41–122 | ³ 28–18 | 3 | | Viscous liquid. |
| 13 | Acrylonitrile | 100 | do | 870 | 4 | 6.0 | −76–41 | 24 | 44 | ² 1.15 | Powder. |
| 14 | {Methyl methacrylate / 1,3-butadiene} | 50 / 50 | do | 870 | 5 | 5.0 | 41 | 21 | 63 | | Tough, flexible solid. |
| 15 | {Methyl methacrylate / Styrene} | 50 / 50 | do | 870 | 5 | 5.0 | 41 | 21 | 60 | | Do. |
| 16 | {Methyl methacrylate / Ethyl vinyl ether} | 50 / 50 | do | 870 | 5 | 5.0 | 41 | 21 | 61 | | Do. |
| 17 | {Methyl methacrylate / 1,3-butadiene} | 50 / 50 | Cyclohexane | 780 | 5 | 5.0 | {41 / 122} | 18 + 18 | 40 | | Brittle solid, plastic. |
| 18 | {Methyl methacrylate / Styrene} | 50 / 50 | do | 780 | 5 | 5.0 | {41 / 122} | 18 + 18 | 43 | | Brittle solid. |
| 19 | {Methyl methacrylate / 2-methyl-5-vinylpyridine} | 50 / 50 | do | 780 | 5 | 5.0 | {41 / 122} | 18 + 18 | ⁴ 47 | | Do. |
| 20 | {Methyl methacrylate / Methacrylonitrile} | 50 / 50 | do | 780 | 5 | 5.0 | {41 / 122} | 18 + 18 | ⁵ 49 | | Do. |
| 21 | Methyl vinyl ketone | 100 | do | 780 | 6 | 5.0 | 41 | 47 | 70 | ¹ 0.06 | Do. |
| 22 | Ethyl acrylate | 100 | Toluene | 870 | 6 | 10.0 | 41 | 53 | 15 | | Soft, tacky elastomer. |
| 23 | {Methyl methacrylate / 2-methyl-5-vinylpyridine} | 50 / 50 | do | 870 | 6 | 10.0 | −22 | 0.75 + 14.9 | 56 | | Tough, flexible solid. |
| 24 | {Methyl methacrylate / N-vinyl-2-pyrrollidone} | 50 / 50 | do | 870 | 6 | 10.0 | −22 | 0.5 + 15.1 | 60 | | Brittle solid. |
| 25 | 1,3-butadiene | 100 | Cyclohexane | 780 | 7 | 4.0 | 122 | 24 | 76 | 0.42 | Very soft rubber. |
| 26 | Methyl methacrylate | 100 | Toluene | 870 | 7 | 3.0 | 41 | 24 | 69 | ¹ 4.17 | Brittle solid. |
| 27 | 1,3-butadiene | 100 | Cyclohexane | 780 | 8 | 2.0 | 122 | 24 | 15 | | Liquid. |
| 28 | Styrene | 100 | Toluene | 870 | 11 | 6.8 | 122 | 69 | 10 | | |
| 29 | Methyl methacrylate | 100 | do | 870 | 11 | 4.5 | 41 | 69 | 10 | | |

¹ Determined in chloroform.
² Determined in dimethylformamide.
³ Temperature 41° F. for 28 hours, then 122° F. for 18 hours.
⁴ Product contained 0.79 weight percent nitrogen.
⁵ Product contained 5.1 weight percent nitrogen.

The above example and the data in Table II demonstrate that a variety of products including liquids, elastomers, and plastics can be produced from a variety of types of monomers using the organocalcium initiators of this invention, and that very high molecular weight polymers are produced by the homopolymerization of methylmethacrylate.

EXAMPLE III

An in situ technique was employed in which an initiator was formed in the presence of monomer and the polymerization of the monomer then occurred. The following recipe was employed.

Styrene, grams _____ 10
Tetrahydrofuran, ml. _____ 100
Anthracene, mole _____ 0.025
Calcium, gram atom _____ 0.05
1,2-dibromoethane, ml. _____ 0.1
Time, hours _____ 48
Temperature, ° F. _____ 122
Conversion, percent _____ 100

Anthracene was charged first, then the calcium, tetrahydrofuran, and styrene, respectively. After 48 hours, a 10 weight percent solution of 2,2'-methylene-bis(4-methyl-6-tert-butylphenol) in equal volumes of isopropyl alcohol and toluene, was added to the polymerization mixture, the amount used being sufficient to provide 1 part by weight of the antioxidant per 100 parts by weight of the polystyrene. The product was recovered by coagulation in isopropyl alcohol and was separated and dried. The inherent viscosity of the polymer was 0.19. The above example demonstrates that the in situ technique can be employed wherein the organocalcium initiator adduct is formed in the presence of the monomer which is then polymerized.

EXAMPLE IV

The calcium/anthracene initiator, as employed in Run 1 of Table I was used to demonstrate the effect of washing the initiators as hereinbefore mentioned.

After the reaction and formation of the calcium/anthracene initiator compound had been accomplished, the reaction product was separated from the tetrahydrofuran; the tetrahydrofuran being withdrawn following centrifugation. This initiator was washed (stirred) with 100 ml. of toluene at 122° F. for 30 minutes. The mixture was centrifuged, toluene withdrawn, and the washing was repeated. This washed initiator and the unwashed initiator of Run 1, Table I, were employed for the polymerization of butadiene. The recipe was as follows:

1,3-butadiene, parts by weight: 100
Cyclohexane, parts by weight: 780
Initiator, mhm.: variable
Temperature, ° F.: 122
Time, hours: 20

Mhm. = gram millimoles per 100-gram monomer.

The results are reported in Table III.

TABLE III

|  | Initiator (washed) | | | Initiator (unwashed) | | |
|---|---|---|---|---|---|---|
|  | 1 | 2 | 3 | 4 | 5 | 6 |
| Initiator, mhm | 2.34 | 3.51 | 4.68 | 2.26 | 3.48 | 4.70 |
| Conversion, percent | 100 | 98 | 96 | 88 | 88 | 94 |
| Inherent viscosity | 2.56 | 1.66 | 1.33 | 1.75 | 1.32 | 0.98 |
| Microstructure, percent: |  |  |  |  |  |  |
| Cis | 14.9 | 12.0 | 13.1 | 12.1 | 12.4 | 15.2 |
| Trans | 77.1 | 79.6 | 78.4 | 76.1 | 75.3 | 71.4 |
| Vinyl | 8.0 | 8.4 | 8.5 | 11.8 | 12.3 | 13.4 |

These data show that by washing the initiators of our invention with a non-reactive liquid in which the initiator is less soluble, i.e., when compared to the solubility of the initiator in the ethereal diluent in which it was prepared, that increased monomer conversion and polymers with a higher inherent viscosity at a given level of initiator are produced.

Evaluation of some polymers initiated with the organocalcium initiators of this invention are represented in Table IV.

Polymers A, B,, and C represented therein are those polymers previously produced and represented in Table II, Runs 3, 2, and 9, respectively.

For comparative evaluation purposes, polymers initiated by initiators other than those of this invention were likewise evaluated. The data reported in Table IV demonstrate that the polymers prepared with the organocalcium initiators of this invention exhibit, not only excellent properties in general, but display much higher tear strength than the polymers produced by other initiators. The data also demonstrate the processibility of the polymers of this invention.

Comparative control polymers D, E, F, and G, respectively, are a 43-Mooney emulsion polybutadiene; a 45-Mooney polybutadiene prepared with an organoaluminum and a titanium halide initiator; a 37-Mooney solution polybutadiene prepared with an organolithium initiator; and a 49-Mooney, 75/25 butadiene/styrene copolymer prepared with an organolithium initiator.

As will be evident to those skilled in the art, various modifications of the invention can be made, or followed in light of the teachings and discussion set forth herein without departing from the scope or spirit or our invention.

What is claimed is:

1. A polymerization process comprising reacting under polymerization conditions at least one polymerizable monomer with an effective initiating amount of organocalcium polymerization initiator, wherein said organocalcium polymerization initiator is prepared by a process comprising contacting substantially pure calcium metal with polynuclear aromatic compound or polyaryl-substituted ethylene in the presence of ether diluent containing 2 to 20 carbon atoms and 1 to 4 ether groups, wherein said polynuclear aromatic compound comprises an aromatic hydrocarbon containing at least a 3-ring structure in which at least two of said rings are aromatic, at least two of said rings are fused, and the total number of carbon atoms per molecule is from 12 to 40; said polyaryl-substituted ethylene contains at least two aryl-substituted radicals and contains from 14 to 40 carbon atoms per molecule; and said polynuclear aromatic compound or polyaryl-substituted ethylene can contain alkyl, cycloalkyl, aryl, alkoxy, aryloxy, alkylthio, arylthio, or N,N-dialkylamino radicals or combinations thereof, with up to 25 carbon atoms in the radicals, and wherein said polymerizable monomer comprises unsaturated organic compounds containing the $CH_2=C<$ group.

2. The process of claim 3 wherein said polymerization conditions include a polymerization temperature of $-100°$ F. to $+200°$ F., said effective initiating amount ranges from 1 to 100 gram millimoles per 100 grams of monomer employed, and wherein said contacting is conducted in the further presence of a promoter wherein said promoter is a halogen-containing organic compound which reacts to expose fresh calcium metal.

TABLE IV.—EVALUATION OF CALCIUM ADDUCT INITIATED POLYMERS

| Polymer | Polymer characteristics | | | | | | |
|---|---|---|---|---|---|---|---|
|  | A | B | C | D | E | F | G |
| Ca-A[a], mmoles | 3.4 | 2.7 | 2.7 |  |  |  |  |
| Butadiene/styrene | 100/0 | 100/0 | 75/25 | 100/0 | 100/0 | 100/0 | 75/25 |
| Trans/vinyl | 78/9 | 77/8 | 68/8 | 75/17 | 2.4/3.6 | 52/11 | 46/33 |
| Raw ML-4 at 212° F.[b] | 16 | 35 | 66 | 43 | 45 | 37 | 49 |
| Polystyrene, percent [c] |  |  | 7.9 |  |  |  | 0 |
| Polymer, wt | 100 |  |  |  |  |  |  |
| IRB, #2 | 50 |  |  |  |  |  |  |
| Zinc oxide | 3 |  |  |  |  |  |  |
| Stearic acid | 2 |  |  |  |  |  |  |
| Flexamine [d] | 1 |  |  |  |  |  |  |
| Philrich 5 [e] | 10 |  |  |  |  |  |  |
| Sulfur | 1.75 |  |  |  |  |  |  |
| NOBS special [f] | 1.1 | 1.1 | 1.1 | 1.2 | 1.0 | 1.1 | 1.0 |
| Processing data (6 x 12 inch roll mill) | | | | | | | |
| Cpd. ML-4 at 212° F | 30 | 52 | 75 | 61 | 74 | 50 | 52 |
| Rheometer at 307° F.[g]: | | | | | | | |
| Max. viscosity, units | 35.4 | 46.5 | 38.6 | 60.3 | 69.2 | 76.0 | 57.1 |
| Cure rate, units/min | 6.00 | 6.8 | 4.1 | 4.5 | 6.8 | 10.8 | 6.3 |
| 95% cure, min | 18.2 | 19.5 | 22.2 | 34.8 | 23.7 | 24.0 | 28.8 |
| Reversion, min | 35.8 | 30.1 | 45.5 | None | 52.4 | 49.0 | 53.5 |
| Physical properties (30 min. cure at 307° F.) | | | | | | | |
| Compression set, percent [h] | 28.1 | 21.3 | 21.7 | 20.1 | 16.5 | 19.2 | 20.4 |
| 300% modulus, p.s.i. [i] | 580 | 590 | 1,180 | 1,075 | 865 | 970 | 1,210 |
| Tensile, p.s.i. [i] | 1,965 | 2,650 | 3,300 | 2,600 | 2,360 | 2,315 | 3,565 |
| Elongation, percent [i] | 650 | 700 | 640 | 540 | 550 | 500 | 610 |
| ΔT, ° F. [j] | 130.8 | 88.0 | 96.4 | 74.4 | 60.3 | 71.0 | 64.4 |
| Resilience, percent [k] | 55.4 | 61.1 | 54.6 | 58.7 | 69.3 | 68.4 | 65.2 |
| Shore A Hardness [l] | 54.5 | 56.5 | 69 | 56 | 58 | 60.5 | 59 |
| Tear, 80° F., lbs./in. [m] | 280 | 295 | 330 | 225 | 145 | 165 | 225 |

[a] Calcium-anthracene reaction product; [b] ASTM D 1646–63; [c] Determined according to Kolthoff et al., J. Polymer Sci. 1, 429 (1946); [d] A physical mixture containing 65% of a complex diarylamine-ketone reaction product and 35% of N,N'-diphenyl-p-phenylene-diamine; [e] Highly aromatic oil; [f] N-oxydiethylene-2-benzothiozolesulfuramide; [g] Monsanto oscillating disc rheometer; [h] ASTM D 395–55, Method B (modified); [i] ASTM D 412–62T; [j] ASTM D 623–62; [k] ASTM D 945–59; [l] ASTM D 1706–61 Shore Durometer, type A; [m] ASTM D 624–54 Die A, crescent.

3. The process of claim 1 wherein
said contacting is at a temperature in the range of about −100° F. to 200° F., and the ratio of gram atoms of said calcium metal to moles of said polynuclear aromatic compound or to moles of said polyaryl-substituted ethylene is in the range of about 1:1 to 25:1,
said polymerizable monomer is selected from the group consisting of vinyl pyridines, vinyl quinolines, vinyl pyrrolidones, alkyl, cycloalkyl, and aralkyl esters of acrylic and methacrylic acid, vinyl ketones, α,β-unsaturated nitriles, conjugated dienes, and vinyl-substituted aromatic hydrocarbons.

4. The process of claim 2 wherein said polymerizable compounds comprise 1,3-butadiene, styrene, methyl vinyl ketone, methyl methacrylate, 2-methyl-5-vinyl pyridine, acrylonitrile, ethyl vinyl ether, or isoprene.

5. The process of claim 2 wherein said organocalcium polymerization initiator is prepared in situ during said polymerization process.

6. The process of claim 2 wherein said substantially pure calcium metal has been finely divided by the vaporization thereof.

7. The process of claim 2 wherein said polynuclear aromatic compound or said polyaryl-substituted ethylene is anthracene, acenaphthylene, perylene, fluoranthene, 1,2-benzanthracene, 2,3-benzanthracene, 9,10-diphenylanthracene, phenanthrene, chrysene, stilbene, or tetraphenylethylene.

8. The process of claim 2 wherein said ether diluent is tetrahydrofuran, 1,2-dimethoxyethane, or 1,4-dioxane.

9. The process of claim 2 wherein in said contacting process the addition of said promoter is in the range of about 0.002 to 0.2 mole per gram atom of calcium.

10. The process of claim 9 wherein said promoter is 1,2-dibromoethane, methyliodide, ethyl bromide, or ethyl iodide.

11. The process of claim 2 wherein said organocalcium polymerization initiator is recovered and washed in a non-reactive liquid wherein said non-reactive liquid comprises a liquid in which said organocalcium initiator is less soluble than in said ether diluent.

12. The process of claim 7 wherein said liquid is toluene.

13. The process according to claim 3 wherein said polymerizable monomers comprise said conjugated dienes.

14. The process according to claim 13 wherein said polymerizable monomer is 1,3-butadiene and said polynuclear aromatic compound is anthracene.

15. The process according to claim 13 wherein said polymerizable monomer is isoprene and said polynuclear aromatic compound is anthracene.

16. The process according to claim 13 wherein said polymerizable monomer is 1,3-butadiene and styrene and said polynuclear aromatic compound is anthracene.

17. The process according to claim 13 wherein said polymerizable monomer is methyl methacrylate and 1,3-butadiene and said polynuclear aromatic compound is acenaphthylene.

18. The process according to claim 13 wherein said polymerizable monomer is methyl methacrylate and 1,3-butadiene and said polynuclear aromatic compound is acenaphthylene.

19. The process according to claim 13 wherein said polymerizable monomer is 1,3-butadiene and said polynuclear aromatic compound is fluoranthene.

20. The process according to claim 13 wherein said polymerizable monomer is 1,3-butadiene and said polynuclear aromatic compound is 1,2-benzanthrene.

21. The process according to claim 3 wherein said polymerizable monomer is styrene and said polynuclear aromatic compound is anthracene.

22. The process according to claim 3 wherein said polymerizable monomer is methyl methacrylate and said polynuclear aromatic compound is anthracene.

23. The process according to claim 3 wherein said polymerizable monomer is acrylonitrile and said polynuclear aromatic compound is anthracene.

24. The process according to claim 3 wherein said polymerizable monomer is methyl vinyl ketone and said polynuclear aromatic compound is acenaphthylene.

25. The process according to claim 3 wherein said polymerizable monomer is methyl methacrylate and said polynuclear aromatic compound is acenaphthylene.

26. The process according to claim 3 wherein said polymerizable monomer is 2-methyl-5-vinylpyridine and said polynuclear aromatic compound is acenaphthylene.

27. The process according to claim 3 wherein said polymerizable monomer is acrylonitrile and said polynuclear aromatic compound is acenaphthylene.

28. The process according to claim 3 wherein said polymerizable monomer is methyl methacrylate and styrene and said polynuclear aromatic compound is acenaphthylene.

29. The process according to claim 3 wherein said polymerizable monomer is methyl methacrylate and ethyl vinyl ether and said polynuclear aromatic compound is acenaphthylene.

30. The process according to claim 3 wherein said polymerizable monomer is methyl methacrylate and styrene and said polynuclear aromatic compound is acenaphthylene.

31. The process according to claim 3 wherein said polymerizable monomer is methyl methacrylate and 2-methyl-5-vinylpyridine and said polynuclear aromatic compound is acenaphthylene.

32. The process according to claim 3 wherein said polymerizable monomer is methyl and methacrylonitrile and said polynuclear aromatic compound is acenaphthylene.

33. The process according to claim 3 wherein said polymerizable monomer is methylvinyl ketone and said polynuclear aromatic compound is perylene.

34. The process according to claim 3 wherein said polymerizable monomer is ethyl acrylate and said polynuclear aromatic compound is perylene.

35. The process according to claim 3 wherein said polymerizable monomer is methyl methacrylate and 2-methyl-5-vinylpyridine and said polynuclear aromatic compound is perylene.

36. The process according to claim 3 wherein said polymerizable monomer is methyl methacrylate and N-vinyl-2-pyrrolidone and said polynuclear aromatic compound is perylene.

27. The process according to claim 3 wherein said polymerizable monomer is methyl methacrylate and said polynuclear aromatic compound is fluoranthene.

38. The process according to claim 3 wherein said polymerizable monomer is styrene and said polynuclear aromatic compound is 9,10-dimethylanthracene.

39. The process according to claim 3 wherein said polymerizable monomer is methyl methacrylate and said polynuclear aromatic compound is 9,10-dimethylanthracene.

References Cited

UNITED STATES PATENTS

| | | | |
|---|---|---|---|
| 2,800,559 | 7/1957 | Ubbelohde | 201—63 |
| 3,354,190 | 11/1967 | Ramsden | 260—429.7 |
| 3,509,067 | 4/1970 | Bostick | 252—431 |
| 3,639,346 | 2/1972 | Hsieh et al. | 260—63 R |
| 3,642,922 | 2/1972 | Uraweck et al. | 260—665 R |

LESTER L. LEE, Primary Examiner

U.S. Cl. X.R.

260—83.7, 85.5 ES, 86.1 R, 86.7, 88.3 R, 88.7 E, 89.5 A, 91.1 M, 93.5 R, 94.2 R

UNITED STATES PATENT OFFICE

CERTIFICATE OF CORRECTION

Patent No. 3,775,369     Carl A. Uraneck et al     Dated: November 27, 1973

It is certified that error appears in the above-identified patent and that said Letters Patent are hereby corrected as shown below:

Column 14, line 23 after "methyl" should be

--- methacrylate ---.

Column 14, line 50 "27" should be --- 37 ---.

Signed and sealed this 4th day of June 1974.

(SEAL)
Attest:

EDWARD M. FLETCHER, JR.
Attesting Officer

C. MARSHALL DANN
Commissioner of Patents